Aug. 1, 1972        J. A. RIDGWAY, JR        3,681,200
                  SHELL-AND-TUBE FERMENTOR
Filed Nov. 9, 1970                          3 Sheets-Sheet 1

Aug. 1, 1972   J. A. RIDGWAY, JR   3,681,200
SHELL-AND-TUBE FERMENTOR

Filed Nov. 9, 1970   3 Sheets-Sheet 2

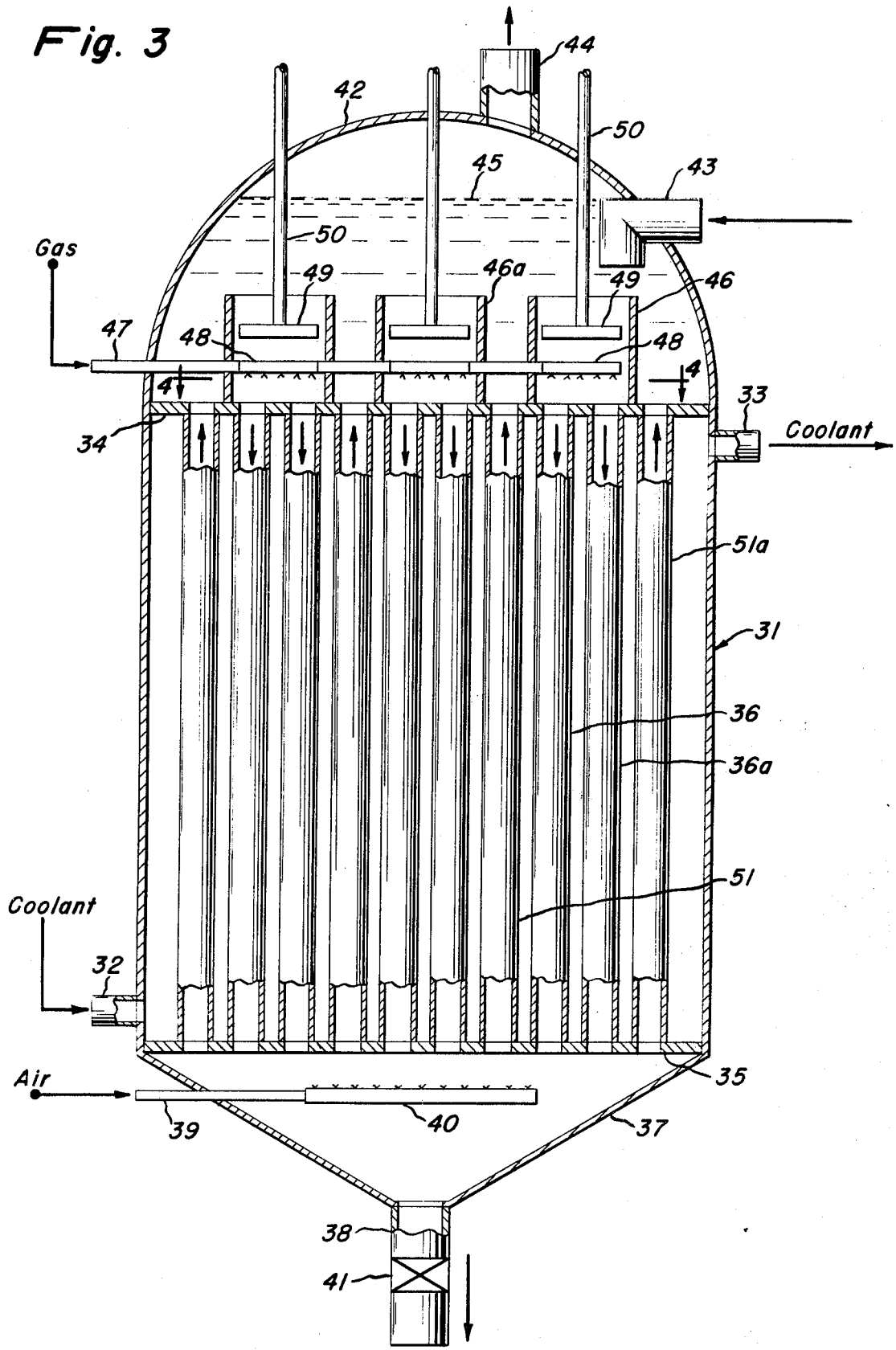

United States Patent Office 3,681,200
Patented Aug. 1, 1972

3,681,200
SHELL-AND-TUBE FERMENTOR
John A. Ridgeway, Jr., La Porte, Ind., assignor to Standard Oil Company, Chicago, Ill.
Filed Nov. 9, 1970, Ser. No. 87,820
Int. Cl. C12b 1/16
U.S. Cl. 195—142                      24 Claims

ABSTRACT OF THE DISCLOSURE

Novel apparatus for aerobic fermentation to produce single-cell microorganisms, such as bacteria and yeasts, is provided. Shell-and-tube heat exchange techniques are adapted to provide coolant on the shell side and circulating fermentation broth on the tube side to achieve economic temperature control.

BACKGROUND OF THE INVENTION

Recent concern for the welfare of the world population has included consideration of additional means for feeding the rapidly increasing number of people involved. The problem embraces providing both adequate per capita caloric intake and a balanced diet, with particular reference to the acknowledged lack of sufficient protein-affording foods in many parts of the world. One means for providing necessary protein supplies is through the growth of single-cell protein-affording microorganisms, such as yeasts, bacteria and algae, for use as either foods or food supplements.

Production of single-cell protein (SCP) materials in large quantity may be accomplished by fermentation processes employing, for example, carbohydrate, hydrocarbon or oxygenated hydrocarbon materials as substrate. Principal requirements are that the substrate material be inexpensive and readily consumed by the selected microorganism so that process costs are not excessive. Equally important is the acceptability and utility of the SCP material as a food or food component. These latter considerations include taste and odor factors relating to public acceptance as well as metabolic and toxicity factors relating to suitability of SCP material for inclusion in the human diet.

Both the technical and the patent literature describe fermentation processes for production of microorganisms which readily afford useful SCP materials. For example, yeasts have been grown on the polysaccharides contained in waste sulfite liquor, the normal alkane components of a gas oil hydrocarbon fuel, and on a mixture of oxygenated hydrocarbons. Production of bacteria has been similarly described. Fermentation to produce yeasts or bacteria comprises an oxidation process, evolving much heat and requiring both substantial oxygen transfer and good control of fermentation temperature. Preferred substrate materials will already contain as much combined oxygen as possible in order to minimize the heat release and the oxygen requirement. Production of food-grade SCP material may also require an extraction step to limit the presence of undesirable, residual substrate material such as high-molecular-weight hydrocarbons or slowly fermented oxygenated hydrocarbon species.

More of the fermentation processes planned or in use currently for production of SCP material are intended to provide primarily an animal feed supplement and hence to supply protein for human consumption only indirectly. However, some microorganisms, notably certain yeasts within the Saccharomycetoideae and Crytococcoideae sub-families, have been certified by the Food and Drug Administration for direct use in foods intended for human consumption.

One highly desirable substrate material is ethanol. It exhibits complete water solubility, is already in a partially-oxidized state, is itself acceptable for use in foods, and creates no problem as to removal from the produced microorganism cells. Although ethanol inhibits growth of many microorganisms, a large number of bacteria and yeasts may readily be grown on this substrate as the only source of carbon.

Heat evolution in the course of growth of bacteria or yeasts on a hydrocarbon or alcohol substrate amounts to from 8,000 to 12,000 b.t.u./lb. The microorganisms generally grow at a reasonable rate only above about 70° F. and most die at temperatures above about 120° F. Accordingly, temperature control is an important economic factor in achieving a suitable conversion of substrate material to protein through the growth of single-cell microorganisms. The key to good temperature control is effective heat exchange, providing optimum means for use of economic coolants such as water, Freon, liquid ammonia and the like.

SUMMARY OF THE INVENTION

It is the purpose of this invention to provide novel fermentation apparatus for improved aerobic fermentation processes, particularly for continuous production of single-cell microorganisms.

It is a further object of this invention to provide apparatus capable of effecting good control of aerobic fermentation temperature by novel use of heat-exchange techniques.

Specifically, a novel fermentation apparatus is provided, based upon an adaptation from the shell-and-tube heat exchanger art, wherein the coolant is circulated through the shell zone and the fermentation temperature is controlled by heat exchange with fermentation broth circulating in selected paths through the tube zone.

DESCRIPTION OF THE DRAWINGS

The drawings illustrate selected embodiments of the fermentor apparatus of this invention.

FIGS. 3 and 4 similarly illustrate a modified apparatus employing means for positively directing the process flow.

Figure 1:
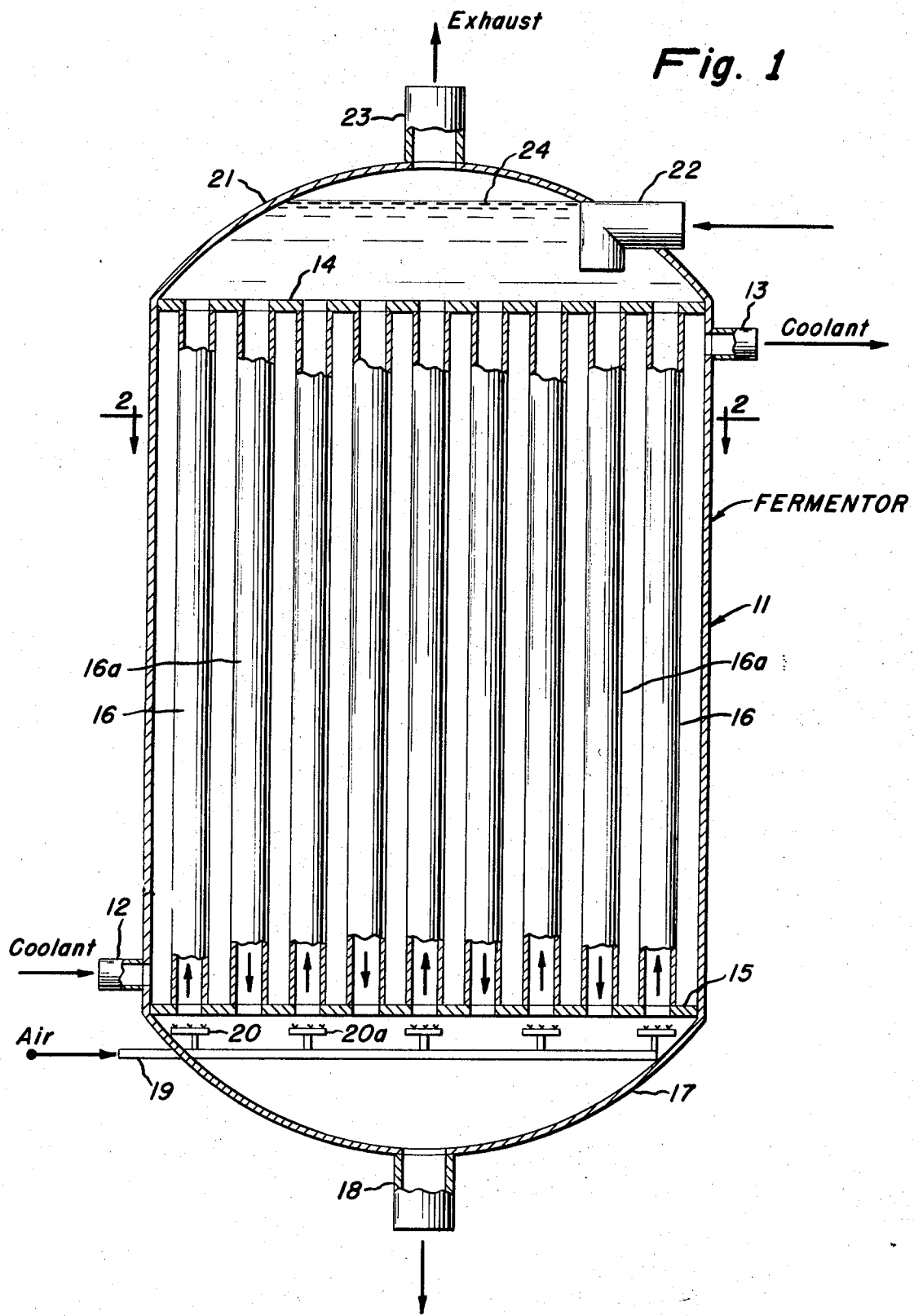
FIGS. 1 and 2 illustrate one embodiment of a shell-and-tube fermentor, including a typical arrangement of tubes.

Referring to the apparatus shown in cross-section elevational view in FIG. 1, the fermentor comprises a cylindrical shell 11 disposed vertically and having a lower liquid inlet line 12 and an upper liquid outlet line 13 to accommodate the flow of coolant through the shell. To the top and bottom ends of shell 11 are sealed, respectively, flat, circular tube-sheet plates 14 and 15, the plates each containing a plurality of conforming perforations adapted to receive the ends of cylindrical tubes 16, 16a, etc. extending through the length of shell 11. Each tube is sealed to the tube-sheet plates and provides the means for vertical passage of a fermentor broth through the tubes to effect fermentation temperature control by heat exchange through the tube wall with the coolant liquid contained on the shell side.

The bottom end of shell 11 is sealed to a hemispherical bottom section 17, fitted with fermentation broth outlet line 18 and air inlet line 19. The air inlet line is fitted with a plurality of gas dispersion means comprising air spargers 20, 20a, etc. The spargers are located beneath alternate tubes and direct the air flow upwardly to accomplish aeration of the fermentation broth and to urge the flow of broth upward in tubes 16 and accordingly permit a downward flow in tubes 16a, the induced flow patterns being shown by arrows.

The top end of shell 11 is sealed to hemispherical top section 21 fitted with fermentation substrate inlet line 22 and exhaust gas exit line 23 located above the liquid level 24. Re-cycle of supernatant fermentation broth from a separation apparatus, not shown, may be effected by commingling with fresh substrate liquid entering the fermentor through line 22.

In another embodiment of this invention, not shown, the flow of fermentation broth is reversed. For example, the fermentor vessel of FIG. 1 would be operated employing bottom entry of the fermentation substrate, suitably through line 18 and top draw-off of fermentation broth, suitably through line 22.

Figure 2:
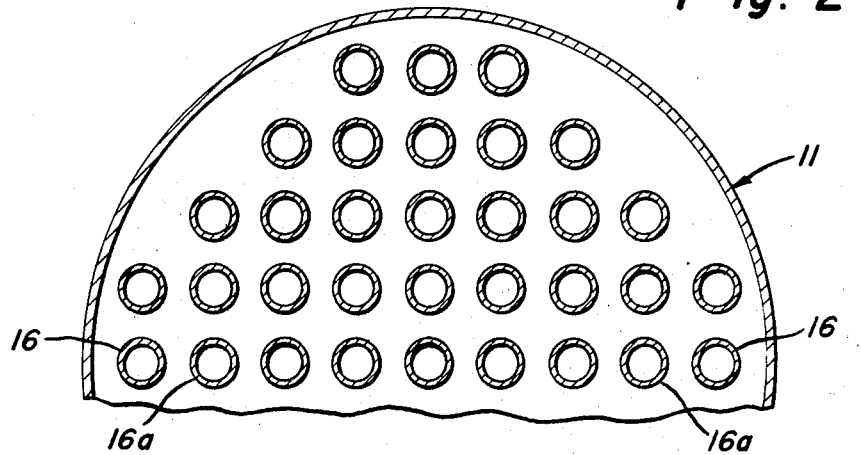

FIG. 2 presents a segment of a horizontal planar section through shell 11 and tubes 16, 16a, etc. taken at plane 2—2 of FIG. 1 to show a typical tube arrangement.

FIG. 3 presents a cross-section elevational view of an embodiment employing modified apparatus comprising cylindrical shell 31, disposed vertically and fitted with a lower coolant inlet line 32 and upper coolant outlet line 33. To the top and bottom ends of shell 31 are sealed, respectively, flat, circular tube-sheet plates 34 and 35, the plates each containing a plurality of conforming circular perforations adapted to receive sealably the ends of cylindrical tubes 36, 36a, and 51, 51a, etc. extending through the length of shell 31. As in the apparatus of FIG. 1, the tubes provide the means for vertical passage of fermentation broth while effecting heat exchange with coolant liquid contained in the shell and thereby maintaining control of the fermentation temperature.

The bottom end of shell 31 is sealed to conical bottom section 37, fitted with fermentation broth outlet line 38 and air inlet line 39. Flow through broth outlet line 38 is controlled by regulating valve 41 which operates to maintain liquid level 45 substantially constant. The air inlet line 39 extends inwardly to a gas dispersion means comprising air sparger 40 located centrally of the bottom section 37.

The top end of shell 31 is sealed to hemispherical top section 42, fitted with fermentation substrate inlet line 43, gas inlet line 47 and exhaust gas exit line 44, located above the liquid level 45. Within top section 42 are disposed a plurality of compartments enclosed within continuous polygonal vertical weir-type baffles 46, 46a, etc., each baffle terminating below liquid level 45 and being sealed to tube-sheet plate 34 to enclose a group of tubes, such as 36, 36a, etc., within the polygonal perimeter of the baffle. The baffles 46, 46a, etc. are spaced to provide about one-half of the tubes as open tubes 51, 51a, etc. surrounding each vertical section described by a baffle.

Within each compartment described by a polygonal baffle 46 there is contained an air sparger 48 connected to gas inlet line 47. Centrally above the air sparger 48 in the compartment is positioned a turbine impeller 49, connected by vertical shaft 50 extending through the wall of top section 42 to motor means not shown. In practice aerated fermentation broth is forced downward through tubes 36, 36a, etc. contained within the perimeter of baffle 46 by the positive downward urging of impeller 49. The broth cycles through the fermentor apparatus by passage through a portion of bottom conical section 37 and upward flow through tubes 51, 51a, etc. as shown by the arrows.

Figure 4:
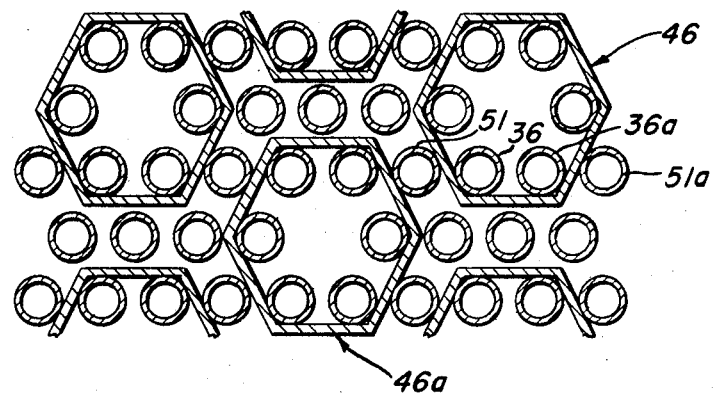

FIG. 4 sets forth a segment of a horizontal planar view of a typical tube arrangement taken along plane 4—4 of the apparatus of FIG. 3, showing particularly the tube placement and depicting the polygonal form of baffle 46 and the relative locations of tubes 26, 26a, 51, and 51a.

DESCRIPTION OF THE INVENTION

This invention embraces novel apparatus for the growth of selected microorganisms, such as bacteria and yeasts, in a continuous manner for production of single-cell protein material suitable for use as a food, food ingredient or food additive intended for human consumption. The growth of the selected bacteria and yeasts by fermentation of hydrocarbon, polysaccharide or alcohol substrates comprise an oxidation reaction which liberates extreme quantities of heat. Fermentation is a temperature-sensitive process requiring efficient removal of heat as it is evolved. This is accomplished in apparatus adapted from the shell-and-tube heat exchanger art to provide novel means for effecting the desired fermentation reactions.

Selected embodiments of the apparatus of this invention, without any implied limitation, are shown schematically in the attached drawings and described above. Each of these exemplifications of the invention includes a vertical fermentor vessel comprising a shell-and-tube section fitted with two end sections. Each apparatus accommodates both liquid substrate and an oxygen-affording gas, such as air, and discharged as both fermentation broth and oxygen-depleted gas after flowing through the tube-side of the vessel. Gas usually flows once-through but the fermentation broth may be cycled through tubes and end (or header) sections as desired. Although not shown, any of the adaptations of the apparatus of the invention can be fitted for recirculation of broth through an external piping system, or preferably for recirculation of supernatant liquor following separation of microorganism cells, as by centrifugation.

Although both top and bottom draw-off arrangements for fermentation broth have been described, a bottom draw-off is preferred to facilitate removal of a representative fermentation broth comprising both liquor and cellular microorganisms. The broth exit line at the bottom of the fermentor vessel should be fitted with a regulating valve, operating in response to a sensor arranged to maintain a substantially constant liquid level in the fermentor. Although generally liquid inlet and exit lines will be situated at opposite ends of the fermentor vessel, this is not critical. Both substrate inlet and broth outlet lines may be placed at the same end of the vessel, either top or bottom, with appropriate spacing.

Within the main section of the fermentor vessel the tube spacing is selected to provide effective circulation of coolant. Baffles may be inserted on the shell side to increase the velocity of the coolant flow. The length of the tubes circulating the fermentor broth must be selected so as to avoid an excessive time interval between injections of fresh oxygen-affording gas. The tube cross-section is selected to provide a balance between heat generation (B.t.u./volume) and heat removal (B.t.u./surface area). The number of tubes is selected to provide the required fermentation volume. The tubes may have any desired cross-section shape although a circular cross-section is preferred. The fermentor vessel dimensions are selected to provide an appropriate enclosure of the tubes.

The external dimensions of the fermentor apparatus of this invention are not particularly critical. Although the drawings depict a cylindrical vessel, any convenient shape is permissible for the outer wall. Similarly, the end sections can be shaped in conformity to the selected shape and dimensions of the main section. For example, a suitable apparatus may comprise only a small number of tubes. Scale-up can be achieved simply by providing additional tubes as required, so that a fermentor having an increased capacity would be expanded in the horizontal dimension.

Aeration is essential to the contemplated fermentation processes but the point at which oxygen-affording gas is provided is not critical. Such a gas, such as air, may be introduced in either the top section, the bottom section or both. Generally a downflow aeration scheme provides a more even dispersion of gas in the liquid phase. In an upflow aeration scheme starvation of cells in the fermentation broth can be avoided by providing fewer downflow tubes than upflow tubes, thus urging the broth more rapidly from the top section back to a source of oxygen.

The exhaust gas outlet line should always be located at the top of the apparatus and there should preferably be a sufficiently large gas disengaging area associated therewith. One advantage of the apparatus of this invention is the provision of a large gas-disengaging area so that carryover of foam can be minimized. It may nevertheless be desirable to provide an external foam separation and liquid recovery unit, fitted with a return line for optional cycling of liquid back to the fermentor, suitably with fresh liquid substrate.

A suitable height for the shell section is within the range from about 15 to about 40 feet, preferably within the range from about 20 feet to 30 feet, and most preferably about 30 feet. The width or diameter of the shell section is not critical and is selected to provide enclosure of the selected number of tubes. The minimum number of tubes is 2 but a practical minimum is about 4 to 6. The maximum number is limited only by practical considerations of construction; e.g., should a more extensive area be covered by one fermentor vessel or by two or more fermentor vessels having the same total capacity. The internal tubes which carry the circulating fermentor broth, when cylindrical, should have a diameter suitable to provide the requisite heat-exchange surface. The tubes may vary in diameter from about 2 feet up to about 5 feet, and preferably should have a diameter of about 3 feet.

Sizing of the end sections is not critical but good engineering skill requires that the included volumes of the respective sections not be unduly great. For example, the bottom section may have any suitable shape and should be adequate in size to accommodate any included gas dispersion means. The top section similarly is not restricted as to shape and may be somewhat larger in volume than the bottom section where the inclusion of impellers is required. There should also be adequate space provided for removal of exhaust gas without undesirable entrainment of foam or liquid.

Temperature control within the range from 80° to 110° F., and preferably at about 90° F., requires extensive cooling. Where water is available at a sufficiently low temperature, cooling may be effected by once-through water circulation through the shell side of the fermentor vessel. In other circumstances a closed refrigeration system is preferred, for example one employing ammonia or a Freon as the refrigerant.

Food industry practice should be followed in selecting materials of construction for use in the fermentation apparatus of this invention. Type 304 stainless steel should be employed with foods or with liquids that eventually come in contact with food.

The yield of microorganism cells, based on substrate consumed, is generally within the range from 65 to 90 wt. percent. Maximum cell yield is obtained at a dilution rate in the range from 0.2 to 0.4/hr.

Typical bacteria and yeasts suitable for growth in fermentation processes employing the apparatus of this invention are listed respectively in Tables I and II.

TABLE I

Suitable bacteria for SCP production:

Acetobacter sp.
Arthrobacter sp.
*Bacillus subtilus*
Corynebacteria sp.
Micrococcus sp.
Pseudomonas sp.

TABLE II

Suitable yeasts for SCP production:

*Candida curvata*
*Candida lipolytica*
*Candida pulcherima*
*Candida utilia*
*Hansenula anomala*
*Oidium lactia*
*Saccharomyces carlsbergensis*
*Saccharomyces cerevisiae*
*Saccharomyces fragilis*
*Trichosporon cutaneum*

Preferred microorganisms include *Saccharomyces cerevisiae*, *Sachraromyces carlsberginsis*, *Saccharomyces fragilis*, and *Candida utilis*. These are preferred because they already possess FDA approval for use in foods intended for human consumption.

Aerobic growth of the selected microorganism is effected on a large scale in a continuous, aseptic fermentation process wherein sterile substrate, nutrients and oxygen are introduced continuously into a fermentor vessel while fermentation broth is continuously removed. Rapid exponential phase growth is maintained by control of the dilution rate (space velocity). Suitable control devices are employed to maintain substantially steady-state conditions. Where the scale of production is sufficiently large, it may be desirable to employ a plurality of fermentors in parallel arrangement. This affords better control of the fermentation while minimizing the shutdown costs should a fermentor become fouled in any manner. Fermentor effluents may thereafter be combined for subsequent downstream processing.

Within the fermentation zone, substrate is maintained in an aqueous phase, having a concentration in the range from 50 to 3,000 p.p.m., and preferably about 100 to 500 p.p.m. Inorganic nutrients are maintained in the fermentation broth at suitable concentration levels by continuous addition in the aqueous substrate phase.

During the fermentation process substrate is consumed with evolution of carbon dioxide gas and an increase in the acidity of the fermentation medium. Combined nitrogen is essential to the growth of the microorganisms and is conveniently added to the fermentation broth as either anhydrous or aqueous ammonia. Being an alkaline reagent, the addition of nitrogen as ammonia also serves to decrease acidity in the fermentation broth. The pH of the medium is maintained in the range from 2.5 to 6.5, preferably from 3.5 to 5.5, and most preferably at about 4.0 This pH control is achieved by controlled addition of ammonia, conveniently by injection of ammonia vapor in the entering compressed air stream.

All liquid streams are sterilized by heating to about 300° F. prior to addition to the fermentor. No sterilization is normally required for the ammonia. Air, optionally enriched with oxygen, is compressed and sterilized by filtration through a series of small-pore or membrane-type glass fiber filters. When mixed with ammonia, the mixed gases are passed through the filter zone.

Care should be taken to maintain all sterile input streams at a higher pressure than non-sterile streams during sterilization heat exchange. Similarly the fermentor should be operated at a positive, super-atmospheric pressure to prevent contamination with non-sterile materials.

Prior to initiating the fermentation all equipment should be sterilized. For example, it is preferred that the fermentor and all lines intended to pass sterile streams be treated for about 20 minutes with steam at a temperature of about 250° F.

In starting a fermentation, an initial loading of the fermentor with aqueous substrate, ammonia and nutrient elements is followed by injection into the aqueous substrate of a culture of the selected microorganism. Air is then sparged into the fermentor. The fermentation zone is maintained at a temperature in the range from 80° to 110° F., and preferably about 90° to 100° F., while the pressure is maintained within the range from 2 to 20 p.s.i.g., preferably about 10 p.s.i.g., to assist in preserving aseptic conditions. The initial slow growth of the microorganisms is superseded after a few hours by the rapid exponential growth which is thereafter maintained in the fermentor by withdrawal of fermentation broth, comprising aqueous medium and suspended cell product, at a rate selected to maintain a cell concentration in the range from 1.5 to 5.0 wt. percent preferably above about 2.0 wt. percent, suspended in the fermentation liquor. The withdrawal rate maintaining this cell concentration should provide an average residence time for fermentation liquor in the fermentation zone in the range from 2 to 4 hours and preferably about 3 hours. Stated in different terms, the dilution rate should be in the range from 0.25 to 0.50/hr. and preferably should be about 0.33/hr.

The withdrawn fermentation broth is sent to a separation stage, preferably a centrifuge, for recovery of the cell product. The aqueous fermentation liquor discharged from the centrifuge may contain sufficient substrate together with nutrient elements and ammonia to make this stream suitable for recycle. In a typical recycle operation abotu 80% by volume of this stream is included in the continuously added substrate phase after a suitable sterilization.

The cell product recovered from the separation zone may be washed with water, pressed an dried as required by the end use intended for the microorganism material.

EXAMPLE

The following example serves to illustrate the growth of *Candida utilis* employing an ethanol substrate and apparatus conforming to one embodiment of this invention.

A vertical fermentor vessel is provided having a shell-and-tube section and two header sections. Dimensions of the shell are 30' x 15.5' I.D. Within the shell and sealed to stainless steel tube sheets at each end of the shell section are 12 tubes (30' x 3' I.D.) fashioned from type 304 stainless steel. The shell is fitted with bottom entry and top exit lines for passage of cooling water at 60° F.

The bottom header is a substantially conical section, fashioned of type 304 stainless steel, sealed to the shell section and having a maximum depth of 3 feet. An axial bottom exit line is provided for removal of fermentation broth. An air sparger line is also provided which is adapted to receive not only compressed air but also a dilute ammonia gas-air mixture.

The top header is a flattened hemispherical section, also fashioned of type 304 stainless steel, sealed to the shell section and having a maximum depth of 4 feet. The top header is fitted off-center with a gas exit line. An aqueous substrate phase entry line is located at one side of the top header. Liquid level is maintained at a level 2 feet above the top tube sheet by controlling the flow of broth through the bottom exit line in response to a level-sensing device. Within the header a continuous upright baffle (18" high) is sealed to the tube sheet to describe a hexagon thereon, enclosing 6 tubes within the perimeter of the continuous baffle, spaced to provide a surrounding group of 6 spaced tubes opening directly into the header section. Within the baffle enclosure there is fitted an air sparger aligned with and directly below an axial-flow turbine impeller. The impeller is driven by a shaft extending upwardly through a seal in the header wall and connected externally to a motor.

After initial sterilization with steam the fermentor is loaded with aqueous nutrient medium containing:

| | G./l. |
|---|---|
| $H_3PO_4$(85%) | 3.24 |
| KOH | 1.28 |
| NaOH | 0.02 |
| $MgSO_4$ | 1.30 |
| $CaCl_2 \cdot 2H_2O$ | 0.48 |

| | Mg./l. |
|---|---|
| Fe Citrate | 2.00 |
| $CuSO_4$ | 0.10 |
| KI | 0.21 |
| $MmSO_4 \cdot H_2O$ | 1.84 |
| $Na_2MoO_4 \cdot H_2O$ | 0.41 |
| $ZnSO_4 \cdot 7H_2O$ | 1.00 |

Ethanol is added to provide an initial concentration of 0.2 wt. percent (2,000 p.p.m.). Initially aqueous ammonia is added as a 30% solution to provide pH 4.0 in the fermentor. An inoculum grown in a batch fermentor is added to provide a cell concentration of 0.1 g./100 ml. and allowed to grow at 90° F. through several doubling cycles. Ethanol substrate and ammonia are added as required to maintain substrate concentration and pH. Addition of nutrient solution and continuous withdrawal of fermentor broth at 90° F. is then begun and maintained at a dilution rate of 0.33/hr. Liquid within the baffled compartments is forced to flow downward through the enclosed tubes by suction of the turbine impeller and circulated back to the top header section through the surrounding tubes. Throughout the run air is sparged into the baffled compartment where it mixes with the impeller-driven stream and is carried to the bottom and back to the top where, essentially spent, it is allowed to disengage. Under these conditions the concentration of dissolved oxygen averages approximately 8 p.p.m.

The cell concentration is lined out at 2 g./100 ml. broth (ca. 2 wt. percent) in steady-state operation. The cell yield, based on ethanol consumed, is 70 wt. percent. The doubling time is 2.2 hours. Harvested dry cells are produced at a rate of 0.34 lb./hr./cu. ft. fermentor volume.

I claim:
1. Apparatus for aerobic fermentation processes for growth of single-cell microorganisms, comprising in combination:
   (a) a vertically-disposed, fermentor vessel shell section having an upper end and a lower end;
   (b) two flat tube-sheet plates, each having a plurality of conforming perforations, fitting sealably to the perimeter of the shell section and respectively positioned horizontally at the upper and lower ends of the shell section, said perforations in the respective upper and lower tube sheets being in vertical alignment;
   (c) a plurality of vertical tubes fitting sealably into the perforations in the upper and lower tube sheets and terminating thereat;
   (d) liquid entry and exit means attached to the shell section and situated respectively substantially adjacent to the lower and upper ends of the shell section to describe a continuous flow pattern therethrough;
   (e) top and bottom sections, describing an enclosed volume and sealably attached respectively to the upper end and the lower end of the fermentor vessel shell section;
   (f) liquid entry and exit means attached respectively to the top and bottom sections;
   (g) gas entry means attached to the bottom section;
   (h) a plurality of gas dispersion means attached to the gas entry means within the bottom section and situated directly beneath alternate vertical tubes, in order to promote upflow of liquid through said tubes and permit downflow of liquid to occur in the remaining tubes; and
   (i) gas exit means attached to the top section.

2. The apparatus of claim 1 wherein the vertical length of the shell section is within the range from about 15 feet to about 40 feet.

3. The apparatus of claim 1 wherein the shell section encloses at least about 4 vertical tubes.

4. The aparatus of claim 1 wherein the perforations in the respective tube-sheet plates are circular and vertical tubes are cylindrical, the tubes having an outside diameter adapted to fit sealably into the circular tube-sheet perforations.

5. The apparatus of claim 4 wherein the vertical length of the shell section is within the range from about 15 feet to about 40 feet.

6. The apparatus of claim 5 wherein the inside diameter of the vertical cylindrical tubes is within the range from 2 feet to 5 feet.

7. The apparatus of claim 6 wherein the shell section has a vertical length of about 30 feet and the vertical cylindrical tubes have an inside diameter of about 3 feet.

8. The apparatus of claim 4 wherein the shell section encloses at least about 4 vertical cylindrical tubes.

9. The apparatus of claim 4 wherein a plurality of gas dispersion means are attached to the gas entry means and situated directly beneath alternate cylindrical vertical tubes, in order to promote upflow of liquid through said tubes and permit downflow of liquid to occur in the remaining tubes.

10. The apparatus of claim 4 wherein the vertically-disposed shell section comprises a cylinder and circular tube-sheet plates, the cylinder being adapted to sealably receive the circular tube-sheet plates.

11. Apparatus for aerobic fermentation processes for growth of single-cell microorganisms, comprising in combination:
(a) a vertically-disposed fermentor vessel shell section having top and bottom ends, top and bottom header sections being attached thereto at the respective top and bottom ends of the shell section;
(b) two flat tube-sheet plates, each having a plurality of conforming perforations, fitting sealably within the perimeter of the shell section and positioned horizontally substantially at the upper and lower ends of the shell section, said perforations in the respective upper and lower tube sheets being in vertical alignment;
(c) a plurality of vertical tubes fitting sealably into the perforations in the upper and lower tube sheets and terminating thereat;
(d) liquid entry and exit means attached to the shell section and situated respectively substantially adjacent to the lower and upper ends of the cylindrical shell section to describe a continuous flow pattern therethrough;
(e) liquid entry and exit means attached respectively to the top and bottom header sections;
(f) gas entry means attached to the top header section;
(g) gas exit means attached to the top header section;
(h) at least one spaced mixing compartment, open at the top and positioned within the top header section above a contiguous group of vertical tubes comprising a continuous vertical weir-type baffle sealed to the upper tube-sheet along a perimeter outside of and described by the group of tubes;
(i) gas sparger means attached to the gas entry means and situated within and near the bottom of the compartment;
(j) impeller means positioned within the compartment and above the gas sparger means;
(k) shaft means attached axially to the impeller means and extending vertically through the wall of the top header section; and
(l) motor means attached to the shaft means externally of the top header section, for driving the impeller and thereby dispersing the gas downwardly from the sparger means into the contiguous group of tubes.

12. The apparatus of claim 11 wherein the vertical length of the shell section is within the range from 15 feet to 40 feet.

13. The apparatus of claim 11 having a plurality of mixing compartments spaced to enclose about one-half of the total number of tubes.

14. The apparatus of claim 13 wherein each mixing compartment is positioned above a contiguous group of from 4 to 6 tubes and the weir-type baffle describes a polygonal perimeter.

15. The apparatus of claim 11 having gas entry means attached to the bottom header section and gas dispersion means, situated centrally within the bottom header section, attached thereto.

16. The apparatus of claim 11 wherein the tube-sheet plates have circular perforations and the vertical tubes are cylindrical, the perforations being adapted to fit sealably about the outer diameter of the vertical cylindrical tubes.

17. The apparatus of claim 16 comprising a plurality of mixing compartments spaced to enclose about one-half of the total number of tubes.

18. The apparatus of claim 16 wherein each mixing compartment is positioned above a group of from 4 to 6 contiguous tubes to describe a polygonal perimeter upon the tube-sheet plate.

19. The apparatus of claim 18 wherein each mixing compartment is positioned above a group of 6 contiguous tubes to describe a hexagonal perimeter.

20. The apparatus of claim 16 wherein the vertical length of the shell section is within the range from about 15 feet to about 40 feet.

21. The apparatus of claim 20 wherein the cylindrical tubes have a diameter within the range from about 2 feet to about 5 feet.

22. The apparatus of claim 21 wherein the cylindrical tubes are about 30 feet long and about 3 feet in diameter.

23. The apparatus of claim 16 wherein the vertically-disposed fermentor vessel shell section comprises a cylinder and circular tube-sheet plates, the cylinder being adapted to sealably receive the circular tube-sheet plates.

24. The apparatus of claim 23 comprising a conical bottom header section, having liquid exit means attached axially thereto.

References Cited

UNITED STATES PATENTS 3,041,181    6/1962    Simonin et al. ........ 195—142

ALVIN E. TANENHOLTZ, Primary Examiner

U.S. Cl. X.R.

195—143, 49; 261—77